United States Patent

Uhlig et al.

[11] Patent Number: 6,014,899
[45] Date of Patent: Jan. 18, 2000

[54] METHOD AND APPARATUS FOR MEASURING VIBRATION DAMPING OF BRAKE PARTS

[75] Inventors: Robert P. Uhlig, Rochester Hills; Cheryl A. Fry, Auburn Hills, both of Mich.

[73] Assignee: Chrysler Corporation, Auburn Hills, Mich.

[21] Appl. No.: 08/931,819

[22] Filed: Sep. 16, 1997

[51] Int. Cl.[7] .............................. G01M 7/00; G01H 13/00
[52] U.S. Cl. ................. 73/664; 73/662; 73/579; 73/11.05
[58] Field of Search .............................. 73/579, 660, 671, 73/657, 866.5, 667, 668, 662, 663, 664, 573, 574, 584, 11.05

[56] References Cited

U.S. PATENT DOCUMENTS

| Re. 23,090 | 3/1949 | Firestone | 73/67 |
|---|---|---|---|
| 2,618,968 | 11/1952 | McConnell | 73/67 |
| 2,758,706 | 8/1956 | Quinlan | 203/75 |
| 3,228,233 | 1/1966 | Keldenich | 73/67.8 |
| 3,417,610 | 12/1968 | Nance et al. | 73/67.7 |
| 4,211,105 | 7/1980 | Szabo et al. | 73/11 |
| 4,502,329 | 3/1985 | Fukunaga et al. | 73/573 |
| 4,513,622 | 4/1985 | Uretsky | 73/664 |
| 4,543,827 | 10/1985 | Tominaga et al. | 73/602 |
| 4,545,249 | 10/1985 | Matay | 73/597 |
| 4,817,431 | 4/1989 | Schlawne | 73/600 |
| 4,979,952 | 12/1990 | Kubota et al. | 318/169 |
| 5,086,564 | 2/1992 | Schalz | 248/638 |
| 5,113,697 | 5/1992 | Schlawne | 73/602 |
| 5,275,052 | 1/1994 | Luttrell et al. | 73/619 |

Primary Examiner—Hezron Williams
Assistant Examiner—Helen C. Kwok
Attorney, Agent, or Firm—Lawrence J. Shurupoff

[57] ABSTRACT

The vibration damping properties of brake rotors and drums can be represented accurately and repeatably by a single factor obtained from a curve fitting based on an eighth order sine function. A series of test points is used to measure resonant frequencies and vibration decay times around the periphery of a part. This data is then used to determine Q-factors which are found to vary sinusoidally around an annular brake part.

12 Claims, 3 Drawing Sheets

METHOD AND APPARATUS FOR MEASURING VIBRATION DAMPING OF BRAKE PARTS

BACKGROUND OF THE INVENTION

1. Field of the Invention

The present invention relates in general to predicting the level of noise or brake squeal produced by a brake part during braking, and relates in particular to a method and apparatus for defining and quantifying vibration and noise suppression of a brake part as a single number known as the quality factor or Q-factor.

2. Description of Prior Developments

A longstanding problem associated with the use of vehicle brakes is the generation of annoying noise often referred to as brake squeal. Brake rotors and drums, such as used in virtually all transportation vehicles, are generally considered to be the source of a variety of such noises and associated vibrations.

In order to reduce brake noise, brake rotors and drums have been manufactured using materials and processes which tend to reduce the vibrations produced during braking. Typically, the greater the ability of a brake part to damp vibrations, the less apt the part is to make undesirable braking noise.

Brake component manufacturers, as well as brake system designers, manufacturers and assemblers have attempted to control brake system noise by specifying a minimum amount or minimum level of vibration damping inherent in brake components such as brake rotors and brake drums. Unfortunately, conventional vibration damping measuring techniques used to establish and verify vibration damping properties of brake components have not always provided consistent measurements.

That is, prior vibration measuring techniques attempted to quantify vibration damping performance in terms of a quality factor commonly expressed as a dimensionless number referred to as the Q-factor. The lower the Q-factor, the higher the damping performance of the part and the less likely the part is to squeal during use. In order to quantify the amount of vibration damping in a part, the Q-factor is calculated from the product of a constant term of 27.3 multiplied by the resonant frequency of the part in Hertz and divided by the slope of the vibration decay curve of the part.

Although Q-factors have been specified by original equipment manufacturers (OEMs) such as car and truck manufacturers, significant differences in Q-factors have been measured by suppliers and OEMs when measuring the same components. Variations in Q-factor measurement of up to 25 percent have been experienced, even when measuring the same part several times in the same test fixture.

This lack of repeatability in Q-factor measurement can lead to acceptance issues between manufacturers and suppliers regarding the acceptability of brake components. Accordingly, a need exists for a more reliable method and apparatus for measuring vibration damping in brake system components. A particular need exists for a more reliable and repeatable method and apparatus for measuring and quantifying Q-factor.

SUMMARY OF THE INVENTION

The present invention has been developed to fulfill the needs noted above and therefore has as an object the provision of an improved method and apparatus for measuring vibration damping in a part such as a brake drum or brake rotor. Another object is to increase the reliability and repeatability of measuring and predicting vibration damping characteristics in brake rotors and drums and accurately quantifying such characteristics with a single parameter known as the Q-factor.

The objects of the invention have been realized through the discovery that the variability of prior vibration damping measuring techniques is due at least in part to the heretofore unaccounted and unappreciated presence of a second or twin vibrational bending mode shape which is displaced 45° away from the first as measured circumferentially around a brake part and occurs at a frequency typically 0 to 5 Hertz different from the first.

The first bending mode produces two nodal diameters. That is, four circumferentially spaced vibrational nodes and four circumferentially spaced vibrational antinodes are produced by vibrational displacement of a brake component such as a rotor or drum as it is excited at its resonant frequency. Prior Q-factor measuring techniques were based on the assumption that this was the only significant bending mode shape present. However, it has been to discovered in accordance with the invention that the second twin bending mode shape present is significant and also produces two similar nodal diameters, but circumferentially rotated 45 degrees apart from the first bending mode shape.

The first and second bending mode shapes are superimposed within the brake component in such a manner that a node of the first resonant frequency becomes or is located at an antinode of the second resonant frequency of the twin mode pairs. The present invention takes into account the realization that as a sample part is rotated and its Q-factor is calculated at closely spaced intervals of rotation, first one of the mode pairs is excited, and then the other.

At everywhere except the respective antinodes of the two bending modes, a portion of the vibrational energy being applied to a test part by a vibration testing apparatus is drained by the response of the other bending mode. Thus, at most test points, i.e., those not lying on an antinode of one of the modal pairs, energy transmitted to the test part, such as applied by an exciter coil, is absorbed by two separate modes of vibration. This absorption of energy by two vibrational displacement mode shapes, instead of only the single one previously utilized in measurement, produces a proportionately lower Q-factor.

Prior Q-factor measuring techniques were unable to account for the relatively large differences in Q-factors measured on the same part. This difference has now been attributed to the sharing of vibrational input energy between two modal pairs of vibration.

In accordance with a refinement of the invention, it has been discovered that this variation in Q-factor occurs with respect to the rotational position of the test sample and appears as a sinusoidal function which is periodic over 45 degrees. That is, the resonant frequency divided by the rate of vibrational decay of a part excited at resonance varies sinusoidally around the circumference of the part.

DESCRIPTION OF THE PREFERRED EMBODIMENTS

Figure 1:
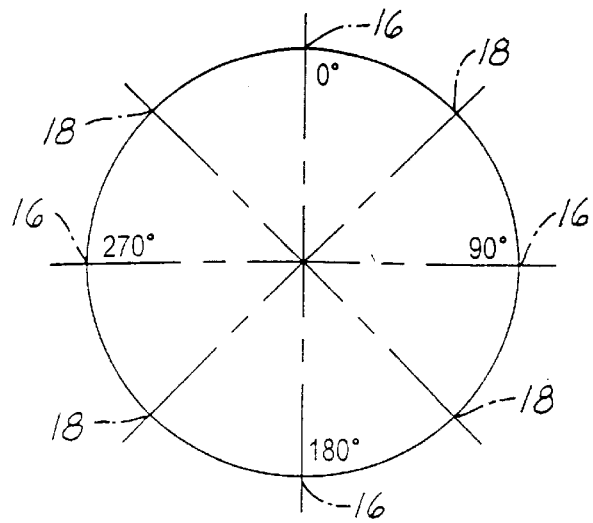
FIG. 1 is a schematic top plan view of a disc brake rotor depicting the pattern of a first vibrational bending mode shape produced by application of an external source of vibration.
Figure 2:
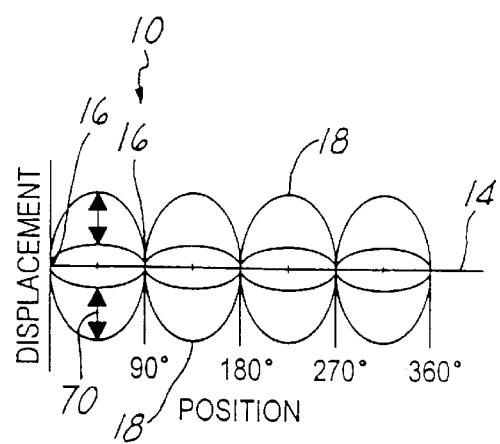
FIG. 2 is a plot of the standing wave displacement of the rotor of FIG. 1 showing the sinusoidal variation in amplitude around the circumference of the rotor.
Figure 3:
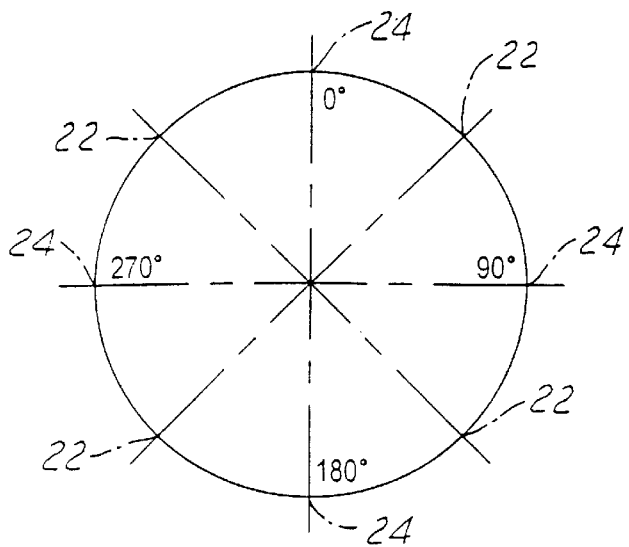
FIG. 3 is a view of the rotor of FIG. 1 depicting a second vibrational bending mode shape which co-exists with and is superimposed upon the first vibrational bending mode shape, but circumferentially displaced by 45°.

The present invention will now be described in conjunction with the drawings, beginning with FIGS. 1 and 2 which represent the location and magnitude of a sinusoidal vibrational standing wave 10 induced in a ferromagnetic brake rotor 12. A source of vibrational energy, such as an electromagnetic exciter coil, can be used to produce the standing wave 10 for the purpose of analyzing the vibration damping characteristics of the rotor.

Beginning at the top or 0° position of rotor 12, standing wave 10 exhibits a node 16 which represents a point of zero or minimum vibrational displacement in rotor 12. As the standing wave 10 is observed at a position displaced 45° clockwise from the top position, the standing wave experiences a sinusoidal increase in vibrational amplitude until reaching antinode 18 which represents a point of maximum vibrational displacement in rotor 12.

Continuing clockwise from antinode 18, the amplitude of standing wave 10 decreases sinusoidally over the next 45° until another node 16 is reached at 90°. This pattern repeats itself over the remaining 270° of the rotor until reaching the initial top position.

It has been discovered that a second standing wave 20 co-exists exists with the first standing wave 10 and influences the Q-factor of the part. The amplitude and period of the second standing wave 20 are virtually the same as those of the first standing wave, but circumferentially displaced on rotor 12 by 45°. In this manner, the nodes 22 of standing wave 20 are located at the same location on rotor 12 as the antinodes 18 on standing wave 10. Similarly, the antinodes 24 of standing wave 20 are located at the same location on rotor 12 as the nodes 16 on standing wave 10.

The presence of standing waves 10 and 20 produces a complex vibrational pattern over rotor 12 which has led to vibration damping measurements which have previously been considered anomalous or spurious. However, once it is appreciated that the vibrational energy applied to rotor 12 is shared between these twin modes of vibration, and that the degree of energy sharing depends on the relative position on rotor 12 where the external vibrational energy is applied, then a consistent reliable method of characterizing as a single parameter the degree of vibration damping inherent in rotor 12 is possible.

In order to characterize the vibrating damping capability of a part, such as rotor 12, as a single parameter such as a Q-factor, the variability of vibration damping as a function of the application point of the input vibrational energy must be considered. This has been accomplished in accordance with the present invention by measuring the Q-factor at a plurality or series of points around a part and calculating a value representative of the entire series.

Figure 5:
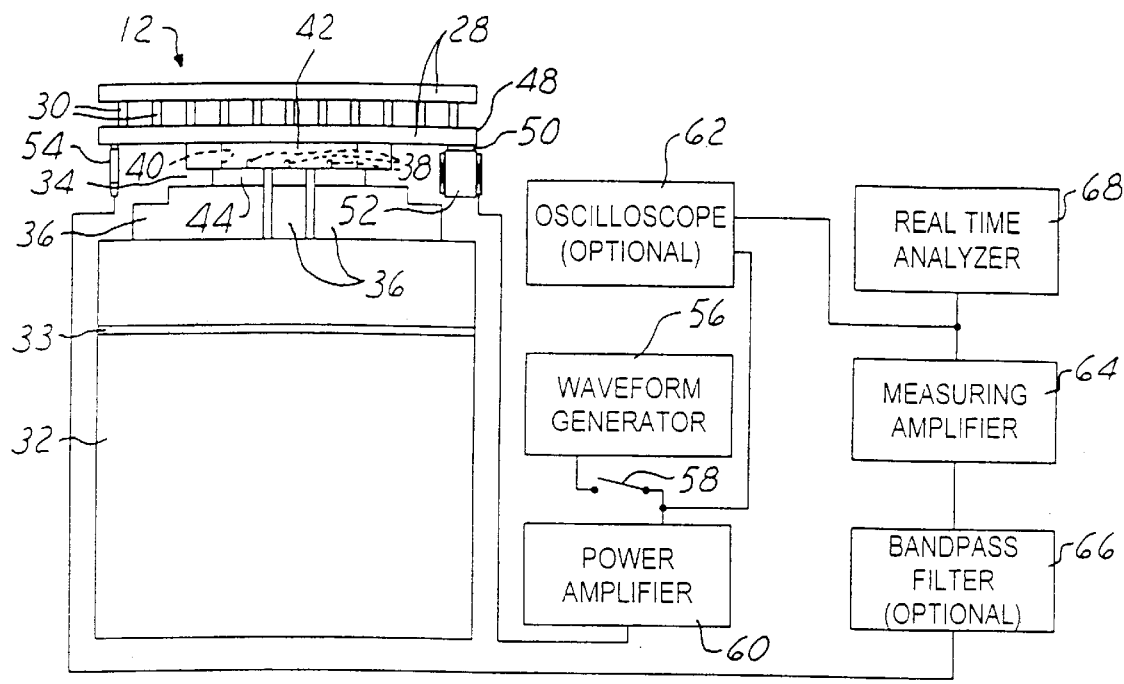
FIG. 5 is a schematic view of a test apparatus arranged in accordance with the present invention and including a block diagram of vibration signal input, output and measuring components.

The test setup of FIG. 5 has been used to provide input data for analysis of the variability of Q-factors and to provide raw data for calculating a single parameter representative of overall vibration damping performance. A test sample part such as brake rotor 12 is used to obtain such data. Rotor 12 includes circular planar side plates 28 braced by interposed radially extending vanes 30. The rotor 12 is supported on a massive base 32. The upper portion of the base can be adjustably and rotatably connected to the lower portion by a rotary coupling 33.

A centering mechanism 34 is provided on base 32 for aligning the rotor on the base in a predetermined centered position. The centering mechanism may take the form of a conventional chuck jaw assembly including three evenly spaced radially adjustable chuck jaws 36. Each chuck jaw includes a finger 38 which is engageable with a central circular bore wall 40 formed in a hub portion 42 of rotor 12.

A vibration isolating pad 44 is provided on each chuck jaw 36 for isolating vibration and energy transmission between the base and centering mechanism and the rotor. This vibration isolation improves the accuracy of the test data by minimizing the influence of external factors, i.e., boundary conditions.

The sample rotor 12 is placed on the rubber or elastomeric isolating pads 44 and the chuck jaws 36 are opened such that fingers 38 abut the central bore wall 40 and thereby center the rotor in a predetermined position. The chuck jaws are then retracted such that fingers 38 are slightly spaced from the bore wall 40 thereby leaving the rotor supported only by contact with the isolating pads.

An exciter coil 46 is then vertically positioned at a predetermined spacing from the lower side plate 28 and horizontally or radially positioned at a predetermined spacing from the outer diameter 48 of rotor 12. In the example depicted in FIG. 5, the outer edge 50 of the coil core 52 is aligned directly below the outer diameter 48 of rotor 12. The exciter coil 46 electromagnetically induces vibrations in rotor 12 without direct physical contact through the application of a pulsing electromagnetic field.

The level or amplitude of vibrations induced in rotor 12 is measured with a transducer such as microphone 54 which may include a preamplifier. The microphone is also carefully positioned adjacent the rotor at a predetermined horizontal and vertical spacing from side plate 28. In the example of FIG. 5, the transducer microphone is positioned diametrically across or 180° from the exciter coil 46.

With the exciter coil and transducer aligned with the rotor such as described above, a waveform or frequency generator 56 is set to provide a sinusoidal wave output at a constant amplitude, with a DC offset. This signal is passed through closed switch 58 to a power amplifier 60 which amplifies the output of the waveform generator and sends the amplified signal to the exciter coil 46. An oscilloscope 62 may be connected to the output of the waveform generator to monitor the waveform frequency.

As the exciter coil 46 magnetically induces vibrations in the rotor 12, the microphone 54 measures the sound or vibration level emitted by the rotor and provides a measure of this sound level to a measuring amplifier 64. A bandpass filter 66 may be used to eliminate frequencies outside the range of interest.

The output of the measuring amplifier is observed as the frequency of the waveform generator is varied. When the measuring amplifier 64 indicates that a peak or resonant frequency, fr, output signal has been received and transmitted by microphone 54, the frequency readout of the waveform generator 56 is noted. Confirmation of the resonant frequency, fr, can be obtained with optional oscilloscope 62.

With the frequency, ω, of the sine wave produced by waveform generator 56 set to produce the peak output amplitude measured by measuring amplifier 64, the gain of the audio power amplifier 60 is adjusted to produce a predetermined measured output voltage from microphone 54. More accurate data is obtained by setting the output voltage from the microphone to the same level for each test location. The real time analyzer 68 is then set to wait for triggering or opening of switch 58.

At this point, switch 58 is opened thereby interrupting the output of the waveform generator 56 and deactivating the exciter coil. This eliminates the input of vibrational energy into the rotor causing the vibrations in the rotor to decay. This decay is recorded and graphed on a decibel versus time plot by the real time analyzer 68 which receives the decaying sound level signal from the measuring amplifier 64.

The measured values of interest obtained from this procedure are the frequency of the waveform generator at triggering and the slope of the decay curve obtained from the real time analyzer 68. In particular, at triggering of switch 58, the real time analyzer 68 plots the decay of the sound level produced by the rotor as a function of time. The resonant frequency at triggering is preferably set to an accuracy of 0.01 Hz and a predetermined portion of the decay curve is measured within an accuracy of 0.001 millisecond.

Figure 4:
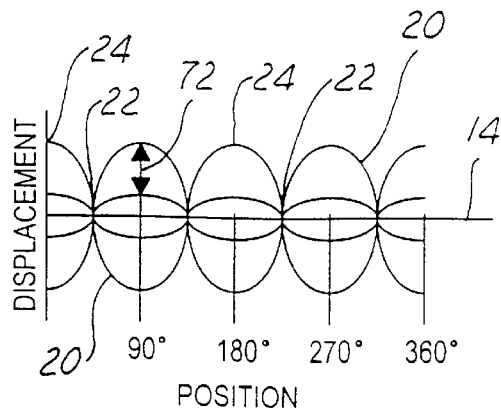
FIG. 4 is a plot similar to FIG. 2, showing the standing wave displacement of the second vibrational bending mode shape.

Although any portion of the decay curve may be chosen for slope measurement purposes, the time for a 25 dB decay from 90 dB to 65 dB has been found suitable for purposes of carrying out the invention. Twenty-five decibels is needed as a minimum decay span to minimize error in determining the decay rate. Linear regression or other curve fitting techniques may be used to calculate this decay time from the real time decay plot. As seen in FIGS. 2 and 4, the amplitudes of both standing waves 10, 20 decrease over the decay time by amounts 70, 72.

Figure 6:
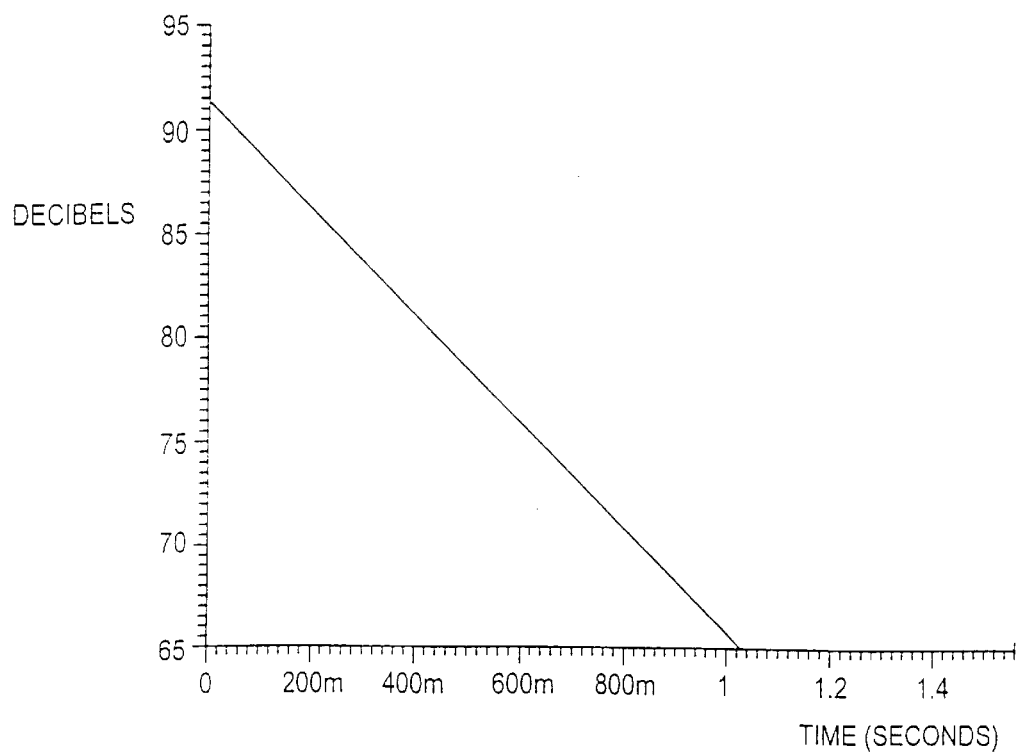
FIG. 6 is a plot of a decay curve obtained from the screen of the real time analyzer of FIG. 5.

FIG. 6 depicts a typical decay curve as recorded on the real time analyzer 68 of FIG. 5. It is the slope of this decay curve which is used to calculate the Q-factor at each test point.

While one decay plot per test location may be adequate, it has been found advantageous to obtain two, three or more decay plots for the same test location to obtain an average. This average value is then used to compute the Q value. At this point the rotor is rotated on its support through rotatable coupling 33 or other suitable means to a new test position and the above procedure is repeated.

From 20 to 50 spaced apart positions are measured around rotor 12, preferably using no larger than 10 degree increments between test points to measure the decay curves over at least 180 degrees of the test part. Although equal increments between test points are preferred, unequal increments may be used with equally accurate results. Any point on the circumference of the test part may be chosen as the first test position.

The resonant frequency, fr (in Hertz), for each test position as well as the decay time data for each test position is entered into the formula:

Q=(27.3)(fr)(decay time in seconds per 25 dB decay span).

The resulting Q values for each test position are processed using known curve fitting techniques to identify any consistent relationship between test position and Q-factor values.

It has been empirically determined that the test data best fit an eighth order sine function expressed as:

$$Q = C_1 \sin 8\omega + C_2.$$

Although a simple arithmetic average, median or other parameter calculated from the measured Q values may be used to characterize the damping of the test part as a single value, the most accurate and repeatable characterization of vibration damping has been found to be the value of $C_2$ in the expression $C_1 \sin 8\omega + C_2$. The value of $C_2$ represents the displacement of the midpoint of the sine function to above the horizontal axis of the sine curve plot $C_1 \sin 8\omega + C_2$. The value of $C_1$ represents the amplitude of the sine function, i.e. one-half the difference between the minimum and maximum Q-factor values.

Table 1 provides data obtained using the test equipment and setup of FIG. 5. Each test point was taken in axial alignment with one of the rotor vanes 30. Although the test part may be measured over its entire 360° circumference or periphery, it has been found that measurements taken over 180° of circumference have been satisfactory to accurately determine the value of $C_2$. At least 90° of circumference should be tested to ensure that at least one full period of each mode is included.

TABLE 1

| No. of Rotor Vanes | ██ | |
|---|---|---|
| Coil Position | ██ | inches from edge |
| Coil Spacing | ██ | inches |
| Mic. Position | ██ | inches from edge |
| Mic. Spacing | ██ | inches |
| Sound Level | ██ | volts |
| Decay Rate | ██ | span, dB. |

| Pos | Rotor No. | Fit Q-factor | Position deg | Input Freq ω Hz | Decay Time ms | Q-factor |
|---|---|---|---|---|---|---|
| 0 | ██ | --------- | 0.00 | ██ | ██ | 520.07 |
| 1 | --------- | --------- | 8.57 | ██ | ██ | 502.10 |
| 2 | --------- | --------- | 17.14 | ██ | ██ | 475.18 |
| 3 | --------- | --------- | 25.71 | ██ | ██ | 461.65 |
| 4 | --------- | --------- | 34.29 | ██ | ██ | 488.49 |
| 5 | --------- | --------- | 42.86 | ██ | ██ | 506.38 |
| 6 | --------- | --------- | 51.43 | ██ | ██ | 506.37 |
| 7 | --------- | --------- | 60.00 | ██ | ██ | 479.55 |
| 8 | --------- | --------- | 68.57 | ██ | ██ | 457.16 |
| 9 | --------- | --------- | 77.14 | ██ | ██ | 475.13 |
| 10 | --------- | --------- | 85.71 | ██ | ██ | 502.04 |
| 11 | --------- | --------- | 94.29 | ██ | ██ | 511.02 |
| 12 | --------- | --------- | 102.86 | ██ | ██ | 484.10 |
| 13 | --------- | --------- | 111.43 | ██ | ██ | 457.13 |
| 14 | --------- | --------- | 120.00 | ██ | ██ | 470.48 |
| 15 | --------- | --------- | 128.57 | ██ | ██ | 497.34 |
| 16 | --------- | --------- | 137.14 | ██ | ██ | 506.28 |
| 17 | --------- | --------- | 145.71 | ██ | ██ | 492.85 |
| 18 | --------- | --------- | 154.29 | ██ | ██ | 466.03 |
| 19 | --------- | --------- | 162.86 | ██ | ██ | 461.57 |
| 20 | --------- | --------- | 171.43 | ██ | ██ | 488.51 |
| 21 | --------- | --------- | 180.00 | ██ | ██ | 510.91 |

Figure 7A:
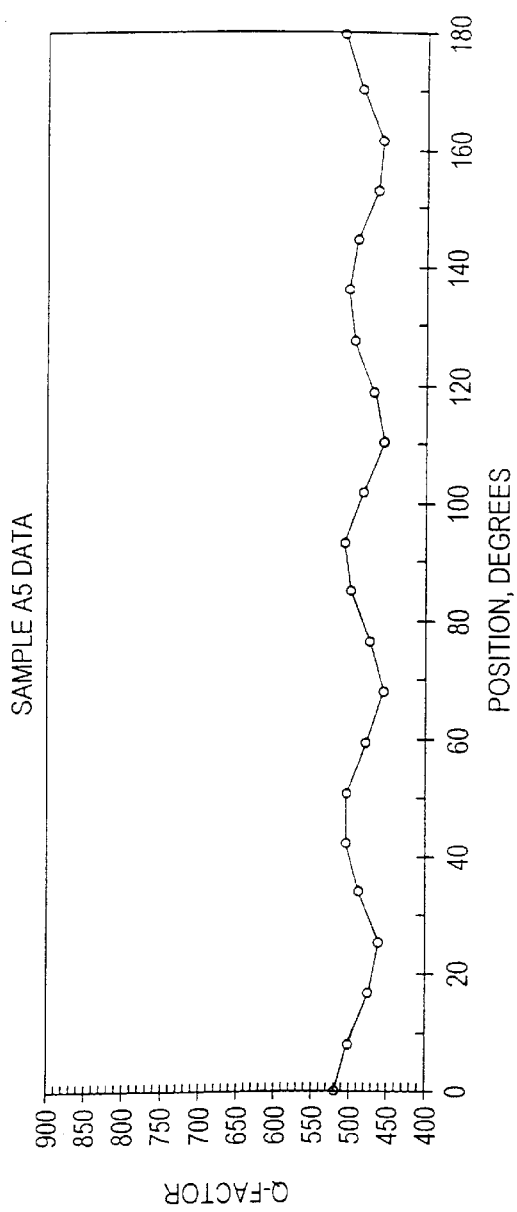
FIG. 7A is a straight line plot of Q-factors derived from the apparatus of FIG. 5 and representing the data provided in Table 1.
Figure 7B:
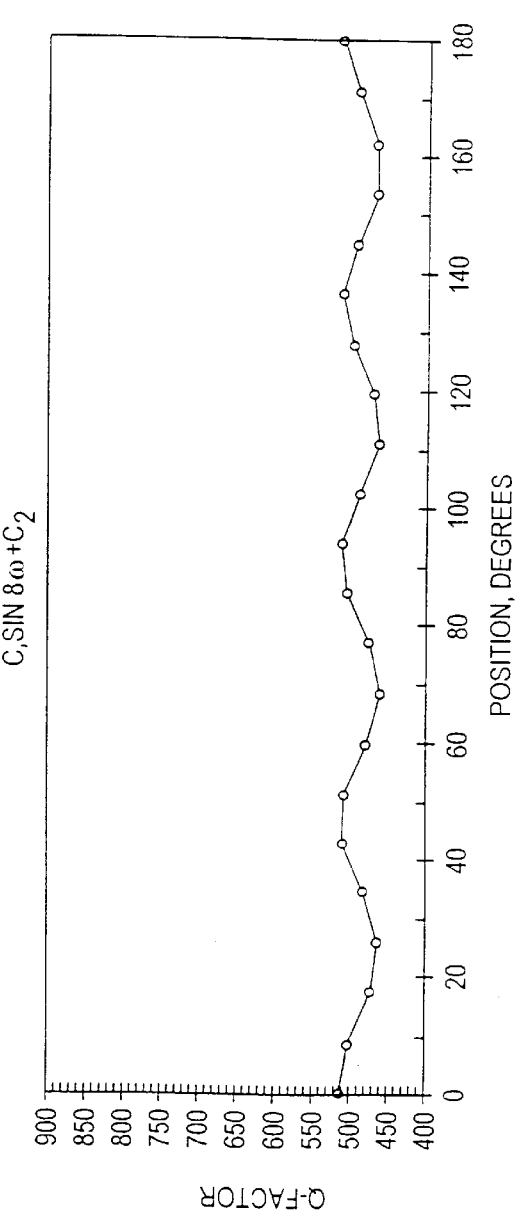
FIG. 7B is a plot of the eighth order sine function which fits the data of Table 1.

The data of Table 1 has been plotted and interconnected by straight lines in FIG. 7A and in FIG. 7B the eighth order sine function, $Q = C_1 \sin 8\omega + C_2$, which fits the same data has been plotted. It can be seen that this data plot closely follows the eighth order sine function and is periodic over 45°. It should be noted that although the Q-factor varies sinusoidally around the circumference of the rotor, it does not follow the displacement pattern of the vibration modes depicted in FIGS. 1 through 4 which is, in fact, periodic over 90°.

The average of the Q-factors measured in Table 1 equals 487.29 while $C_2$ calculated from commercially available best fit curve fitting software equals 486.12. However, the actual range of Q values in Table 1 extends from 457.13 to 520.07 which equals a variance of 62.94. Such a variance of over 10% in the same part clearly emphasizes the problem associated with prior measuring techniques.

Clearly, the present invention provides much improved repeatability over prior techniques which did not appreciate or account for the sinusoidal nature of the Q-factor with respect to sample rotational position and the concept of mode pairs. Even at an antinode, the Q-factor is very sensitive to the excitation frequency, changing as much as 5% for only one Hertz change in frequency.

By curve fitting the Q-factor data using commercially available software such as Lotus or Excel spreadsheet software, to an eighth order sine function, anomalous data points are prevented from unduly affecting the result, i.e., the value of $C_2$.

The determination of accuracy of sine wave fit to the data is useful to improve the accuracy of $C_2$, the Q-factor value for the sample. An average difference of less than 10 between the calculated sine wave values and the measured Q-factor values has been found to be an indication of suitable accuracy of fit. In the case where the average difference is greater than 10, recalculation of the sine wave fit after dropping the point or points which exhibit the greatest difference(s) further improves the accuracy of $C_2$.

Many modifications and variations of the present invention are possible in light of the above teachings. Therefore, within the scope of the appended claims, the present invention may be practiced otherwise than as specifically described. For example, the invention is not limited to ferromagnetic parts. Paramagnetic parts may be tested using the setup of FIG. 5 and nonmagnetic parts may be mechanically excited to their resonant frequencies. Moreover, the invention is not limited to annular parts and may be used effectively with rectangular and asymmetrical parts.

What is claimed is:

1. A method of measuring vibration damping of a part, comprising the steps of:

(1) vibrating said part at a selected frequency, with a vibrator located adjacent a test portion of said part;

(2) measuring an amplitude of vibration of said part during said vibrating;

(3) deactivating said vibrator such that said amplitude decays;

(4) measuring a decay time of said amplitude over a selected range of decay;

(5) repeating each of said steps 1, 2, 3 and 4 with said vibrator respectively located adjacent each one of a series of spaced apart test portions of said part to obtain a series of decay times; and (6) determining a value associated with said series of test portions representative of vibration damping of said part and related to said selected frequency.

2. The method of claim 1, wherein said part comprises a ferromagnetic part, wherein said vibrator comprises an exciter coil spaced apart from said part and wherein said method further comprises vibrating said part with an electromagnetic field produced by said exciter coil.

3. The method of claim 1, wherein said part comprises a brake part and wherein said method further comprises centering said brake part on a vibration isolating mounting.

4. The method of claim 1, wherein said vibrator comprises a waveform generator providing a signal to a power amplifier and wherein said step 3 comprises removing said signal to said power amplifier.

5. The method of claim 1, wherein said part is centered on a rotatable support and wherein step 5 further comprises rotating said support to respectively align each of said spaced apart portions of said part adjacent said vibrator.

6. The method of claim 1, wherein said amplitude of vibration is measured with a transducer, wherein said selected frequency produces a peak amplitude of vibration in said part and wherein said method further comprises adjusting said vibrator at said peak amplitude such that a predetermined output level is measured by said transducer prior to step 3.

7. The method of claim 1, wherein said amplitude is measured with a microphone, wherein said decay time is measured with a real time analyzer and wherein said method further comprising measuring with said microphone a sound level of said vibrating part and plotting said sound level versus time on said real time analyzer during said decay and measuring a time, td, for a predetermined decay span, dB, after deactivation of said vibrator.

8. The method of claim 7, further comprising computing a value Q for each test portion of said part, wherein $$Q=(27.3)(fr)(td)/\Delta dB$$

wherein fr is a resonant frequency of said part measured in Hertz and td is measured in seconds.

9. The method of claim 8, further comprising fitting each Q value to an eighth order sine curve formula of $C_1 \sin 8\omega + C_2$ as a function of each test portion location.

10. The method of claim 9, further comprising representing the value of step 6 as $C_2$.

11. The method of claim 7, wherein said predetermined decay span, $\Delta dB$, is at least 25 dB.

12. The method of claim 9, further comprising eliminating at least one Q value which deviates greatest from said sine curve formula.

* * * * *